United States Patent [19]

Harrah

[11] 3,729,024

[45] Apr. 24, 1973

[54] MONITORING APPARATUS RESPONSIVE TO OPERATION OF COOPERATIVE EQUIPMENT AT MORE THAN A PREDETERMINED RATE

[76] Inventor: Robert S. Harrah, 4108 DuPont, Houston, Tex. 77006

[22] Filed: Oct. 14, 1970

[21] Appl. No.: 80,681

[52] U.S. Cl. ........................................... 137/624.13
[51] Int. Cl. ............................................ G05b 19/44
[58] Field of Search ................. 137/624.11, 624.13, 137/624.14, 624.15

[56] References Cited

UNITED STATES PATENTS 3,326,237   6/1967   Frick ............................ 137/624.14

*Primary Examiner*—Alan Cohan
*Attorney*—Donald Gunn

[57] ABSTRACT

For cooperation with an apparatus which must function periodically in a manner which is manifested by physical movement, a monitoring device which responds to the physical movement by forming a pneumatic pulse of a predetermined length, the pulse being fed to an accumulator and stored therein, the accumulator being steadily bled off; a pressure above a predetermined level is required within the accumulator to hold open a valve which is operated should the pressure drop below a predetermined level, the valve controlling continued operation of the cooperative equipment. Should the pressure within the accumulator drop below the level, the monitoring equipment shuts down the cooperative equipment.

9 Claims, 1 Drawing Figure

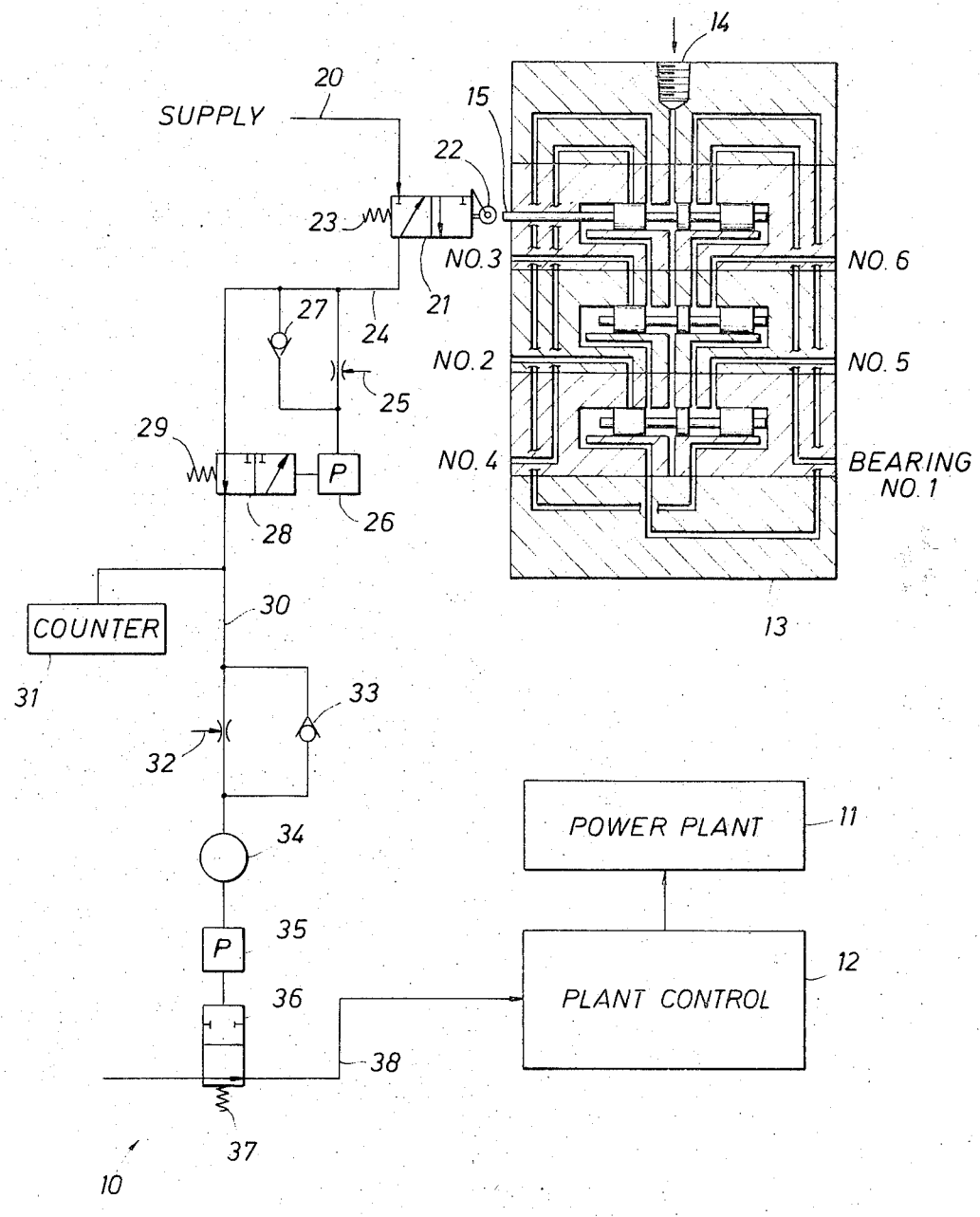

MONITORING APPARATUS RESPONSIVE TO OPERATION OF COOPERATIVE EQUIPMENT AT MORE THAN A PREDETERMINED RATE

SUMMARY OF PROBLEM AND SOLUTION

The present apparatus is generally directed to monitoring equipment for installation with a stationary power plant, rotary equipment, or the like. It lends itself to this equipment in particular, and other equipment in general, as will be understood after an examination of the description. In such stationary engines and other similar equipment, it is usually quite harmful to continue operation of the equipment after failure of critical portions. One of the most critical aspects of a large stationary engine includes lubrication of the bearings in the engine. Many stationary engines, and other large pieces of equipment, include separately powered lubrication systems wich utilize a positive displacement pump to oil the several bearings found in the system. Normally, such lubricators function at a specified rate. In the event that the lubricator drops below the specified rate, it may well mean that the bearings in the stationary power plant are dry for lack of lubrication. Because of this very significant risk, the monitoring device of the present invention is intended to protect stationary equipment, to monitor its operation, and if need be, shut the equipment down.

With the foregoing in view, the apparatus will be described and summarized cooperative with the stationary power plant. The present invention is intended to be cooperative with a piece of equipment which must function periodically above a predetermined rate. This functioning is manifested by physical movement to which the present invention responds. The present invention, therefore, includes a means responsive to the physical movement wherein a supply of pneumatic pressure is communicated through a normally closed valve. On movement of the cooperative apparatus, the valve is momentarily opened. This opening, of whatever duration, is supplied to a second valve which is held open for a finite interval. The second valve communicates the pressure source with an accumulator. The accumulator is bled at a predetermined rate. The accumulator is connected with a control valve which is appropriately connected with the monitored equipment, and which shuts down when the pressure within the accumulator drops below a predetermined level. The control valve is maintained open so long as pressure within the accumulator is above a predetermined level, representative of operation above the minimum rate for the cooperative equipment.

Many objects and advantages of the present invention will become more readily apparent from a consideration of the following written specification and single drawing, which is:

The single drawing is a schematic of the present invention cooperative with a piece of equipment to be monitored.

In the drawings, the present invention is indicated generally by the numeral 10. It is cooperative with a power plant 11, a plant control mechanism 12, and the equipment 13 which is to be monitored. In some cases, the equipment to be monitored, which is indicated by the numeral 13, is incorporated within the power plant 11. In other cases, it may be separate or remote. The numerals 11, 12, and 13 indicate the supporting equipment helpful in illustrating and describing the present invention.

The equipment 13 which is to be monitored by the invention 10 is an oil lubricator. One version of an oil lubricator is manufactured by the Trabon Engineering Corp. Other companies likewise manufacture oil lubricators. The present invention is not limited to an oil lubricator, and will monitor other equipment quite readily. The oil lubricator will be described very briefly to set forth its mode of operation. Other oil lubricators, or other equipment to be monitored, may function differently, and hence, the description of the equipment 13 is intended not as a limitation on the operation of the present invention.

The oil lubricator 13 has an inlet 14 and various pressure outlets. The outlets are connected by conduits to the bearings in the power plant 11. The outlets are pumped in sequence as numbered. Of particular interest to the present invention is the fact that the lubricator 13 includes a protruding shaft 15 which reciprocates periodically. When the lubricator 13 operates in its customary manner, the protruding shaft 15 periodically strokes. Its periodic stroke is observed and monitored by the equipment of the present invention. Should the rate of operation of the rod 15 fall below a predetermined level, the present invention switches off the power plant 11 by means of a signal provided to the plant control 12.

The monitoring equipment 10 of the present invention is, therefore, responsive to the plunger 15. The monitoring equipment includes a supply line 20 which is connected with a suitable source of pneumatic pressure which is then input to a valve 21. The valve 21 is actuated by a follower 22 which is connected and positioned for response to movement of the plunger 15. A bias spring 23 at the opposite end of the valve maintains the valve in the illustrated position. The valve is therefore opened only when the plunger 15 is moved to the left. The follower 22 responds to the movement and opens the valve 21 to communicate the supply line 20 with the line 24.

Thus, the valve 21 opens and brings the line 24 to the supply pressure. The line 24 is connected through an orifice 25 to a valve operator 26. A check valve 27 is connected across the orifice 25 to bleed the operator 26. The line 24 communicates with a valve 28. A spring 29 maintains the valve 28 in a position to communicate the line 24 with a line 30. However, the connection is terminated by operation of the valve operator 26 which responds to the flow through the line 24, but after a time delay determined by the orifice 25. More will be noted concerning this hereinafter.

The line 30 is connected with a counter 31 which measures the number of pulses passed through the valve 28 in the line 30. The conduit 30 is connected directly to an orifice 32 which is parallel with a check valve 33 which is then connected with an accumulator 34. The accumulator 34 is connected with a valve operator 35. The valve operator 35 controls the position of a valve 36 in conjunction with a return spring 37 on the opposite side. The spring 37 tends to keep the valve open so that a line 38 maintains continuous communication through the valve 36. On the other hand, the valve operator 35 tends to close the valve 36, and hence interrupt flow through the line 38. The line 38 is connected with the plant control 12. When flow through the line 38 is interrupted, the plant control 12 is signalled to the effect that the equipment being monitored is operating at a rate below the predetermined minimum rate as adjusted into the monitoring equipment 10. This will be described in detail hereinafter.

In operation of the present invention, a source of supply is provided to the valve 21 as previously noted. The valve 21 is held open for a length of time which is determined by the rate of operation of the plunger 15. The slower the oil lubricator 13 operates, the longer the plunger 15 is extended. The faster it operates, the time of extension is shortened. Based on these facts, the monitoring equipment 10 incorporates a means whereby duration of the extension of the moving part which is to be monitored is immaterial to the operation of the present invention. This is accomplished through the use of the valve operator 26 which is controllably switched for only a limited interval. That is to say, the valve 28 passes a pulse of pressure fluid in the line 24 to the line 30 for a finite interval. Although the valve 28 is illustrated in the open position, there is no initial flow through the line because the valve 21 is closed. When the valve 21 is opened, the valve 28 is found open. However, the valve operator 26 times out, so to speak, and closes the valve 28. Since operation of the valve 26 is dependent on the delay engendered by the orifice 25, it will be understood that the valve 28 is operative only for a short period of time to pass a pressure pulse of predetermined length. The volume of gas flow in the conduit 30 is thus consistent from operation to operation. The pulses are supplied to the counter 31 which optionally presents the number of operations of the invention.

The pulse passed by the valve 28 charges the accumulator 34. The accumulator 34 stores the volume of pressure fluid. Thus, the accumulator is maintained above a predetermined minimum pressure after the first one or two operations of the equipment. This predetermined pressure is continued for an indefinite period of time, but is gradually reduced by the orifice 32 which slowly bleeds off the air within the accumulator. The accumulator therefore maintains the output valve 36 in its quiescent condition until the pressure within the accumulator drops below the predetermined level and then it interrupts flow through the output valve 36.

The bleed-off of the accumulator 34 is of interest. A pulse of pressure is charged through the check valve 33. Once the accumulator is charged, it continues to bleed-off through the orifice 32 back through the various conduits, including the valve 28, for discharge to atmosphere through the valve 21. The length of the conduit coupled with the orifice 32 determines the rate of bleed-off. As will be understood, the pressure within the accumulator has some affect on bleed-off rate. For a given pulse repetition rate, the accumulator will reach a certain pressure level which will thereafter be maintained so that the amount of air added from the pressure pulse is equalled by the amount of air bled-off through the orifice 32.

From the foregoing, it will be observed that the accumulator integrates the pulses supplied to it which are representative of periodic actuation of the equipment being monitored. Without the pressure pulses, the integral soon falls below the predetermined level which is signalled through the output control valve 38 to the plant control equipment 12.

Many alterations and variations in the present invention may be readily implemented. However, they are normally accomplished with the addition of more complicated and expensive equipment. For instance, the preferred embodiment utilizes a path through the valve 28 and the valve 21 to bleed the accumulator to atmosphere. It might be just as easily accomplished by connecting the orifice 32 from the accumulator 34 straight to atmosphere. However, it is believed that some benefit is obtained by maintaining some pressure in the lines 24 and 30, and to avoid the need for connecting additional lines to the accumulator.

It should be noted that if the oil lubricator 13 fails with the plunger 15 in the extended position, and the valve 21 held open for an extended interval, this circumstance is accommodated inasmuch as the valve operator 26 times out and provides only a pressure pulse of predetermined length to the remainder of the equipment. Without regard to the mode of failure of the equipment being monitored, the apparatus still provides a signal indicative of its failure.

The foregoing is directed to the preferred embodiment of the present invention. It is shown cooperative with a particular brand of engine oil lubricator 13, although quite clearly, other equipment can be readily monitored. The basic requirement is an interface between the monitoring equipment 10 and the equipment 13 being monitored. In the illustrated version, the interface is the plunger 15 which operates periodically. Other interfaces may be used.

The terminology used in this specification is adapted for the claims which are appended hereto.

What is claimed is:

1. Monitoring apparatus responsive to equipment which is to be monitored, comprising:
   an output valve means having at least two operative conditions, one of the conditions being indicative of continued operation of a piece of equipment to be monitored, and the other condition being indicative of some other condition of such equipment to be monitored;
   a pneumatic operator connected to said output valve for changing its operative condition;
   an accumulator connected to said operator for applying pressure thereto which changes the operative condition of said output valve;
   a second valve adapted to be connected with a pressure source;
   a second valve operator connected to said second valve for changing its operative condition, said second valve operator being arranged to open said second valve periodically in response to operation of such equipment to be monitored;
   means for returning said second valve operator to a closed position;
   means for communicating pressure from said second valve to said accumulator, said means further providing a controlled flow of pressure fluid from the source connected to said second valve; and including
   a third valve means;
   a third valve operator means closing said third valve means on operation;

a line connected from the output of said second valve to said third valve operator means;

delay means in said line for creating a time delay in pressure applied to said third valve operator after operation of said second valve;

said third valve means forming a pressure pulse of predetermined duration as determined by the time delay of said delay means to said third valve operator means; and, an additional means cooperative with said accumulator for bleeding pressure within said accumulator.

2. The invention of claim 1 including a pulse counter means connected to said accumulator for measuring the number of pulses applied thereto.

3. The invention of claim 1 wherein said output valve and said pneumatic operator are further defined to include:

a return spring maintaining said output valve in a predetermined position;

said valve operator means operatively being connected with said accumulator for maintaining said output valve in a quiescent condition so long as said accumulator maintains pressure therewithin above a predetermined level, said valve operator operating to reverse the condition of said output valve when the pressure within said accumulator drops below said predetermined level.

4. The invention of claim 1 wherein the last named means includes:

an orifice;

a line used in common with said means communicating pressure from said second valve to said accumulator; and, said second valve having a position opening said line to atmosphere through said orifice, said line and said second valve.

5. The invention of claim 1 including means biasing said output valve against operation of said pneumatic operator.

6. The invention of claim 1 wherein said delay means includes an orifice.

7. The invention of claim 6 including a check valve parallel to said orifice.

8. The invention of claim 1 including means biasing said second valve against operation of said second valve operator.

9. The invention of claim 1 including means biasing said third valve means against operation of said third valve operator means.

* * * * *